United States Patent [19]

Meyer

[11] 4,184,772
[45] Jan. 22, 1980

[54] MIXING APPARATUS

[75] Inventor: Paul Meyer, Wiesbaden, Fed. Rep. of Germany

[73] Assignee: Frenkel C-D Aktiengesellschaft, Vaduz, Luxembourg

[21] Appl. No.: 814,421

[22] Filed: Jul. 11, 1977

[30] Foreign Application Priority Data

Jul. 14, 1976 [GB] United Kingdom ............... 29328/76
Jul. 1, 1977 [GB] United Kingdom ............... 27623/77

[51] Int. Cl.² .......................... B01F 7/08; B28C 1/16; B28C 7/16; A21C 1/06
[52] U.S. Cl. ....................................... 366/77; 366/88; 366/89; 366/99; 366/192; 366/323; 425/376 A; 425/208
[58] Field of Search .................... 366/69, 77, 79, 87, 366/88, 89, 99, 192, 241, 247, 300, 279, 310, 318, 336, 320–323, 339, 340; 425/376 A, 207, 208; 138/40, 46

[56] References Cited

U.S. PATENT DOCUMENTS

| | | | |
|---|---|---|---|
| 1,095,767 | 5/1914 | Adams | 138/46 |
| 1,904,884 | 4/1933 | Royle | 366/144 |
| 2,744,287 | 5/1956 | Parshall et al. | 366/300 |
| 3,102,716 | 9/1963 | Frenkel | 366/321 |
| 3,164,375 | 1/1965 | Frenkel | 366/89 |
| 3,281,123 | 10/1966 | Dailey | 366/192 |

*Primary Examiner*—Harvey C. Hornsby
*Assistant Examiner*—Timothy F. Simone
*Attorney, Agent, or Firm*—Diller, Ramik & Wight

[57] ABSTRACT

This invention provides in a continuously operating device having a mixing section comprising opposite-handed helical threads in each of the two relatively rotatable components which threads vary in cross-sectional area in complementary fashion so as to produce a layer-by-layer material transfer and shear working between the said components, that the said opposite handed helical threads in said mixing section complement one another substantially also in respect to their helix-angles to the extent that if one helix angle is between 0° and 45° the other is between 45° and 90°, to bring about, viewed with respect to the shear-plane-area, a subdivision sufficient for the mixing and compounding requirement.

6 Claims, 14 Drawing Figures

MIXING APPARATUS

This invention relates to machinery for working and/or compounding flowable materials by themselves or with powders, liquids or gases, where the flowable materials may be of high viscosity. It is particularly though not excessively concerned with visco-elastic materials such as rubber.

Continuously operating mixing machinery is known comprising a rotor and a barrel, the rotor having an external helical thread and the barrel having an internal helical thread of opposite hand to but co-axial with the helical thread on the rotor, the threads forming mixing zones in which the thread in one component (e.g., the rotor) varies from full to zero cross-sectional area over a given axial length while the thread in the other component (e.g., the barrel) varies from zero to full corss-sectional area, and vice versa. In operation the material being transported in the one component at the entry of this mixing section or mixing stage is transferred layer-by-layer from the one component (giver) to the other component (taker) into which all the material will have been transferred by the time it reaches the end of the mixing-section, the material having been mixed and worked layer-by-layer during this transfer in accordance with the conditions of relative motion between the two components.

For any two adjacent mixing sections, the roles of "giver" and "taker" change for the same component: For example, a rotor commencing with a feed-section like a normal extruder in a cylindrical-section barrel will, in a first mixing section be the "giver" to the "taker"-helical thread in the barrel while in a second mixing section the "giver"-helicax is that in the barrel while the "taker"-helix is on the rotor. This describes a device with two "shear-planes" (one in each mixing section) through which the mass flow is worked successively on its passage through the device, before leaving through an extrusion head or other exit device.

As the helical threads in the "giver"- and "take"-sections are opposite-handed (e.g., a left-hand helix in the one and a right-hand helix in the other), the relative rotation between rotor and barrel will bring about forward transport in both helical channels at the same time as, and by virtue of shear-working the material being transferred. In fact, in each mixing-section such can be considered a "double-screw extruder" in which the outer (barrel) screw is wrapped around the inner (rotor) screw and where the two interact through the material being transferred across the (imaginary) cylindrical or conical "shear-plane" between them.

This feature is a major positive distinction of this system compared with any extruder-type mixing system having a rotor with helical channels rotating in a cylindrical barrel. In all such systems, mixing and shear-working can only be brought about by putting gaps into the threads and/or locally increasing the leakage-flow across, say, every second land of a thread. Thereby, mixing or shear-working occur only in relatively small zones of high intensity and moreover, at the expense of the forward component of the flow. Thus, in order to achieve a given result with a certain degree of homogeneity, these 'back-flow' systems require high length-to-diameter ratios and are generally limited in application by the danger of overheating, localized hot spots and the like in spite of using sophisticated temperature controls.

This same feature of the system is also the major positive distinction from the so-called twin screw extruders. In essence these have helical rotors on parallel centre lines in a barrel having a figure-of-eight cross-section, the rotors interacting to produce shearing and/or material transfer and/or intensified forward transport at the narrow waist of this twin barrel. Depending on whether these screws actually mesh, forward transport may be very positive in such systems. However, the achievement of a given overall result with a required degree of homogeneity again requires relatively high length-to-diameter ratios on account of the localized nature of the mixing or shear working action, quite apart from the much increased degree of mechanical complexity involved in twin rotor systems compared to single rotor systems.

Although devices according to the system described are thus inherently superior to the other systems referred to, shortcomings in their known forms have emerged as their application to various tasks has proceeded. Such shortcomings will be described in relation to the compounding and extrusion of rubber compounds, but it must be understood that analogous shortcomings arise in respect of other applications, for instance the compounding and extrusion of plastics materials, similar operations in chemical processing in general and as applied to the so-called earth-industries in particular. Neither are such effects limited to the more heavily viscous materials, although in more easily flowable materials the shortcomings may not readily appear as such, but rather can be shown up as the lack of improvements not hitherto capable of realisation.

Continuous rubber mixers or mixer-extruders according to the system described are either fed cold in which case the feed is very stiff, practically a solid, or they are fed warm in which case the feed is highly viscous though usually non-homogeneous with respect to composition and to viscosity. In both cases the feed is practically incompressible and will not 'flow' so that in a mixing section the two machine components must not impose a compression which would result in excessive heating without a corresponding shear-working or mixing effect, thereby reducing the device in effect to one of those from which it has been, in the foregoing description, positively differentiated. Therefore the helices in rotor and barrel generally have much the same helix angle in addition to having the same number of helical channels in parallel in each section: For example, a rotor will usually commence single-start (single channel defined by one thread) in the feed-section and, while decreasing in cross-section and/or helix angle to compress the feed with respect to possibly entrained air, will retain the helix angle much the same in the first mixing section up to the vanishing point of this helical channel. In the barrel, there might be 2 or 4 helices in parallel (2- or 4-start screw), but these would again remain on much the same helix angle throughout the first and second mixing section. In the second mixing section, the rotor might begin as a 2- or 4-start screw, depending on the application, but still on the same helix angle between 30° and 40°. From considerations of geometry, such a helix angle will limit the number of starts of 'applicable' cross-sectional shape to a maximum of eight.

In respect to 'applicable' cross-sectional shape, experience has shown that in the first mixing section the width of helical channel particularly in the "taker" component should not exceed a certain maximum in order to avoid cold or less-mixed and more viscous lumps which, once allowed to arise, prove very difficult to eliminate even with many more than one successive mixing section.

Geometrical considerations on the use of channels of given width at equal helix angles in both 'giver-' and 'taker'-components show that the number of helical channels in parallel (number of starts of a screw) is limited for each such angle. The number of starts, however, becomes greater the larger the helix angle, i.e., the nearer it approaches 90°, when one is dealing with a number of parallel splines in rotor or barrel.

An additional requirement is that the ratio of depth to width of each channel must not become excessive for the conditions of forward transport by shear-working of the material being transferred at the 'shear-plane' to be maintained in each channel.

On account of the conditions above described, it has been shown in practice:

A. That mixing/compounding or cold-feed extrusion requirements of a more difficult nature, such as extrusion of tougher compounds or final-mixing and extrusion in one operation even on smaller-diameter devices required an increased number of mixing sections, such that the advantages of the system over those differentiated from above were materially reduced;

B. That is proved difficult to scale-up mixer-extruders, especially of the cold-fed variety, in geometrical fashion while maintaining the quality of performance obtained on smaller-diameter machines, thereby again losing a main advantage of the system described over those differentiated from above.

It is an object of this invention to overcome the above shortcomings for instance for cold-fed mixer-extruders for rubber to achieve high unit throughputs with regard to screw-diameter with high quality of extrudate with a device of a small length/diameter ratio as given by a two-shear-plane construction.

It is a further object of the invention to realise on mixer-extruders of the type described the advantages of operating at low length/diameter ratios, such as a low temperature threshold of the material being worked mechanically with the achievement of required high degrees of uniformity even against little or no exit resistance, whereby any necessary greater specific work inputs can be achieved by simple throttling devices to to achieve a required energy input level from below without loss of uniformity and without danger of overheating, and without the need for excessive cooling and for very sophisticated temperature-control.

It is a further object of this invention generally to enable adiabatic operation to be approached for whatever 'working' may be required, to be able to run devices at higher rotational speeds and thus higher specific throughputs size for size and to simplify the mechanical construction and thus the cost in relation to mechanical gear reducers and heating or cooling equipment.

It is a further object of this invention to achieve substantially geometrical scale-up of such devices with regard to their leading dimensions such as length with diameter (constant length/diameter ratio) without loss of desirable properties with increasing size.

To achieve the above objects, this invention provides in a continuously operating device having a mixing section comprising opposite-handed helical threads in each of the two relatively rotatable components which threads vary in cross-sectional area in complementary fashion so as to produce a layer-by-layer material transfer and shear working between the said components, that the said opposite handed helical threads in said mixing section complement one another substantially also in respect to their helix-angles to the extent that if one helix angle is between 0° and 45° the other is between 45° and 90°, to bring about, viewed with respect to the shear-plane-area, a subdivision sufficient for the mixing and compounding requirement.

In one embodiment of the invention, for the case of a mixing section in which the giver-component has a thread with a helix angle $\alpha$ smaller than 45°, this invention provides that the taker-component has substantially the complementary helix angle $(90° - \alpha)$. As the transport of material in a helical channel, as far as influenced by the helix-angle, is proportional to the product (sin $\alpha \times \cos \alpha$), the transport factor will be the same for both components while the number of starts in the taker can then be greater than that in the giver.

For example, with a rotor as 'giver' having a helix angle of 32°30' and being of single-start construction following a feed section, a 'taker' barrel with the same helix angle could have a maximum of 8 starts. With a complementary helix angle of 57°30', however, it can have a maximum of well over 30 starts while going up to the same effective cross-sectional area as the 'giver' so as not to impose an excessive compression.

In scaling up according to the provisions of this invention, the actual cross-sectional groove dimensions of a smaller device need not necessarily be reproduced exactly in a larger device. For instance, under the scale-up conditions applying to rubber machinery which is that of equal circumferential speed of the rotors for all sizes which means reducing rotational speed in proportion to rotor diameter, the residence time will increase with size of device. Therefore, for example, if a 120 mm diameter device had a barrel with initially 20 starts, a 250 mm diameter device of approximately double the diameter need not necessary have 40 starts initially, but for instance 32 may be found quite sufficient for a plastifying application.

It may also be found as this invention comes into use that the scale-up factors may change for example for rubber machinery, perhaps in the direction of greater unit throughputs, i.e., to somewhat higher a power than the square of the diameter which is presently the case though with falling standards of quality for the prior art.

However, for devices having different scale-up factors, for instance constant angular rotor speed providing a throughput-rate increasing as the cube of the diameter, as in the case of less viscous materials, the provisions of this invention may make the necessary subdivisions for the maintenance of quality with increasing diameter really possible. In either case, the provisions of this invention are necessary to enable the potential of continuous mixers of the type described to be more nearly approached, both with regard to mixing tasks of greater difficulty for smaller diameter devices and with regard to maintaining this standard of performance in a series of scale-ups of geometrically similar leading dimensions.

Regarding throttling devices, known types such as breaker-plates or screen packs may be used for stepwise adjustable flow-resistance or continuously adjustable needle-valve type devices involving axial relative motion for regulation. However, this invention provides an adjustable throttle flange involving the insertion in a radial direction of one or more flow-restrictors to achieve continuous adjustment also during operation.

The invention will now be further described by way of illustrative example and in some detail with reference to the accompanying drawings in which.

Figure 1:
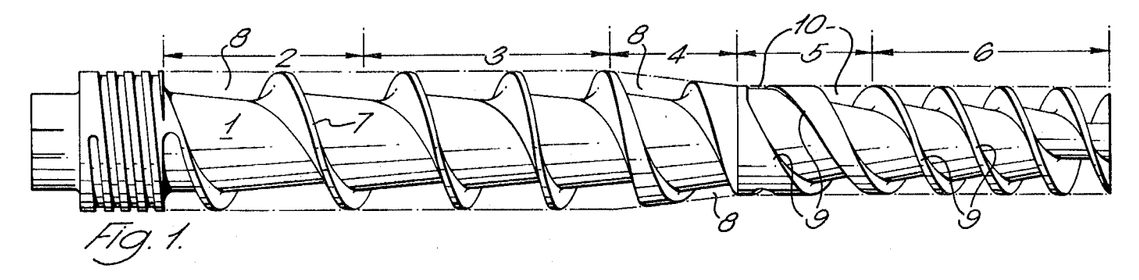
FIG. 1 is a side-view of the rotor of a known cold feed extruder with two shear-planes when used together with barrel-sections shown in FIGS. 5-8, with one helical channel in the first and two helical channels in the second shear-plane.

In FIG. 1 the body 1 of the rotor comprises an entry section 2, a compression section 3 in a cylindrical barrel section (not shown), the first shear plane section 4 and the second shear plane section 5 which can fit any of the 2 shear-plane barrel sections shown on FIGS. 5-8, and a conventional exit section 6 in a cylindrical barrel (not shown).

Through the sections 2-4, there extends the one thread 7, defining a single helical channel 8 which reduces to zero cross-sectional area in the first shear plane 4. Shear plane 4 also has a conical envelope surface. In the second shear plane 5 and the exit section, there are 2 threads 9 defining the helical channels 10 of these sections, starting from zero cross-section at the beginning of the second shear plane.

Figure 2:
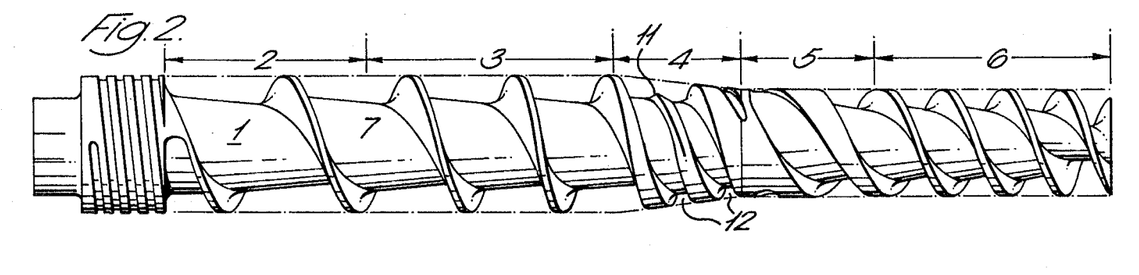
FIG. 2 is a similar rotor showing a simple embodiment of this invention involving a gradual change to two helical channels in the first shear-plane.

In FIG. 2, like numerals denote like parts as in FIG. 1 and there is additionally in the first shear plane section 4 the second thread 11. This rises gradually from the bottom of the single helical channel 8 to define thereafter the 2 helical channels 12.

It will be noted that, in accordance with the invention the additional thread-land starts rising within the first shear plane section 4 and continues for some time as a partial thread before assuming an equivalent size and shape to the original thread 7.

Figure 3:
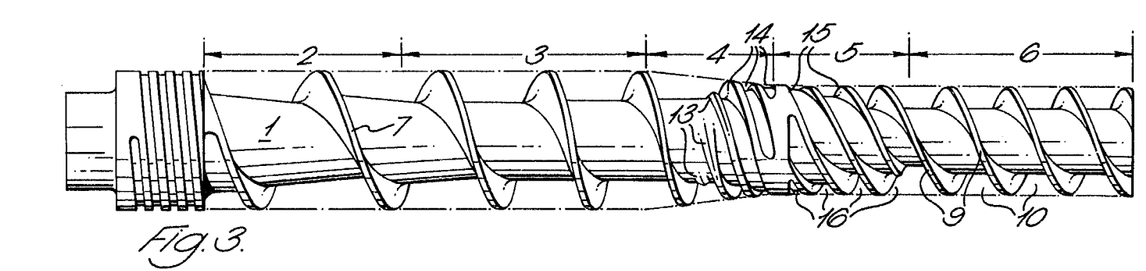
FIG. 3 is a similar rotor showing an alternative way of change to 4 helical channels in the first shear-plane, and 4 channels in the second shear-plane.

In FIG. 3, like numerals denoting like parts as in FIG. 1, there are 3 partial threads 13 rising from the bottom of the original single channel 8 within the first shear plane section 4. These shape up gradually to define four helical channels 14 for the latter part of shear plane 4.

In the second shear plane 5, in addition to the original two threads 9 there are two threads 15, defining together four helical channels 16. As all these start from zero, the development of threads 9 and 15 is quite symmetrical as, naturally, also is the development of the four helical channels 16.

At the end of the second shear plane 5, the two lands 15 end quite abruptly and the exit section 6 has two helical channels 10.

In FIG. 4, again like numerals denoting like parts as in FIG. 1, there are seven additional threads rising in the first shear plane 4 to define eight helical channels 18.

Figure 4:
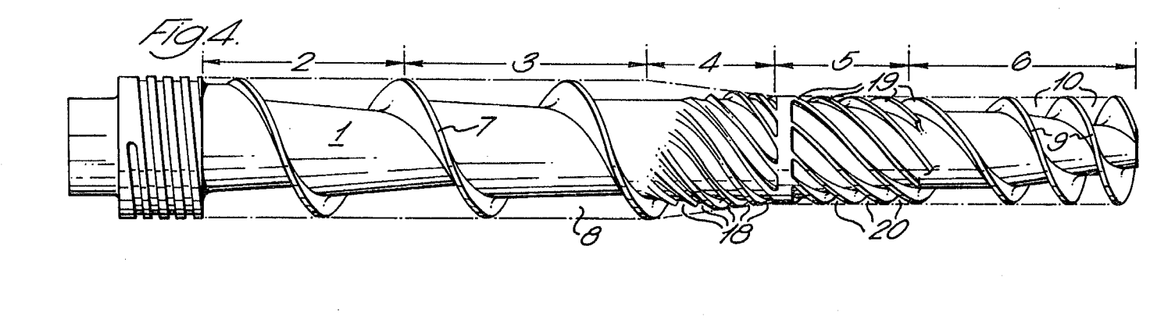
FIG. 4 is a similar rotor showing in the first shear-plane a change from one to 8 helical channels according to this invention.

FIG. 4 shows a preferred way of bringing about the subdivisions of the original one channel 8 into the eight helical channels 18. The first additional thread 17 emerges adjacent the leading edge of thread 7 shortly after the first shear plane 4 begins, followed shortly by the second thread 17 and so on. Thereby the flow of material which in front of the leading edge of thread 7 is compressed while it may be loose and lumpy at the trailing edge of thread 7, is spread across the channel 8 in compressed form as well as being impelled to transfer to the helical channels in the stator.

In the second shear plane 5, the eight threads 19 define the eight helical channels 20 in symmetrical fashion and reduce fairly abruptly to the two threads 9 for the exit-section 6.

Figure 5:
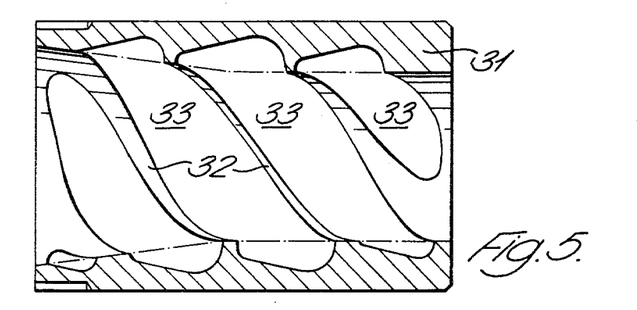
FIG. 5 is a longitudinal section through a barrel-sleeve defining the first and second shear-planes of a known continuous mixer, illustrating a 3-start helical channel on substantially the same helix angle as in the rotor.

In FIG. 5, the shear plane barrel sleeve 31 is shown as the mixing part of the extruder barrel of which the cylindrical sections corresponding to the entry section 2, the compression section 3 and the exit section 6 of the rotor (FIG. 1) are not shown. Three helical threads 32 define a three-start helical channel 33 of a width-to-depth ratio much larger than unity, of a cross-sectional shape well adapted to the transport of rubber, and on a helix angle of approximately 32°30'. This corresponds to conventional construction where the rotor has a similar helix angle.

Figure 6:
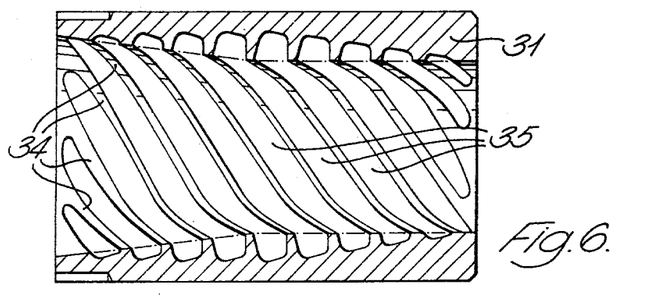
FIG. 6 is a longitudinal section of a barrel-sleeve illustrating 8 starts, i.e., the maximum number of helical channels in parallel which can be accommodated on the same helix angle as in FIG. 5 without excessive maximum depth of channel relative to its width.

In FIG. 6, like numerals denoting like parts as in FIG. 5, there are eight threads 34 defining an 8-start helical channel 35 still on the same helix angle of about 32°30'. It will be seen that unless the width-to-depth ratio of the maximum channel cross-section (as viewed in the plane of the drawing) is reduced below unity, it is impossible to accommodate more than eight channels in parallel while also providing the same cross-sectional area as in FIG. 5.

Figure 7:
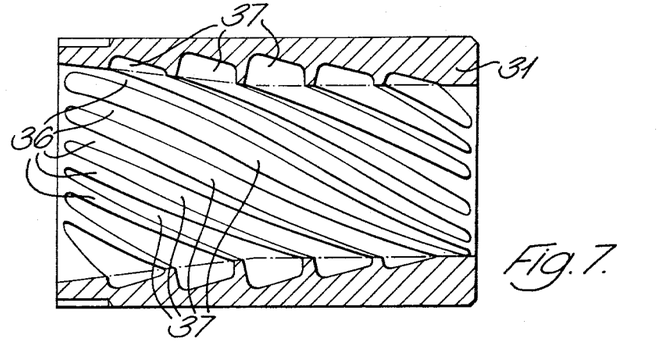
FIG. 7 is a longitudinal section of a barrel-sleeve illustrating, in according with this invention, how the use of the complementary helix angle permits 12 starts or helices in parallel with a low depth-to-width ratio of channel section.

In FIG. 7, like numerals denoting like parts as in FIG. 5, twelve threads 36, but now on the complementary helix angle 90° minus 32°30', i.e., 57°30', define a 12-start helical channel structure 37 in accordance with this invention when used together with any of the rotors of FIGS. 1 to 4. It will be seen that the new complementary helix angle makes it possible to adopt a large width-to-depth ratio for the maximum cross-section of the channels, analogous to that in FIG. 5.

Figure 8:
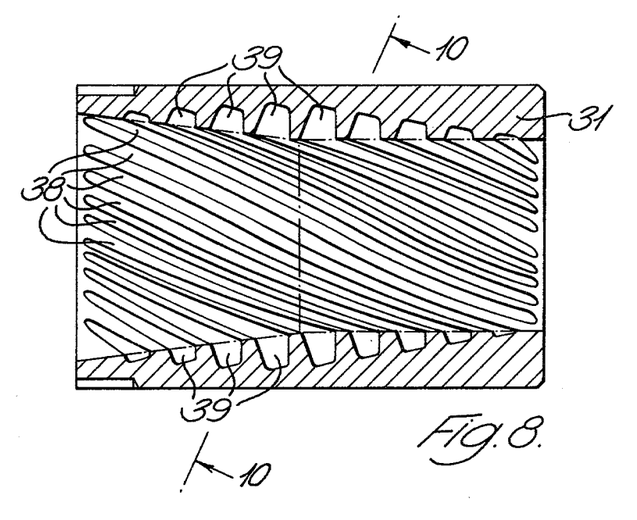
FIG. 8 is a longitudinal section of a barrel-sleeve illustrating, in accordance with the invention, how the use of the complementary helix angle permits 20 starts or helices in parallel without excessive maximum depth-to-width ratio of channel section.
Figure 9:
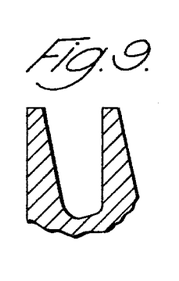
FIGS. 9 and 10 are enlarged sections of the maximum groove cross-sections in the barrel in the plane of the drawing and at right angles to the axis of the groove, respectively.
Figure 10:
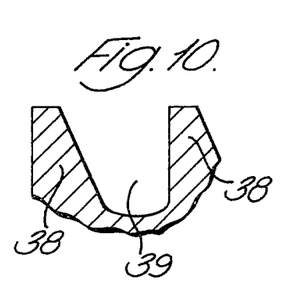

In FIG. 8, like numerals denoting like parts as in FIG. 5, twenty threads 38 on the helix angle 57°30' define a 20-start helical channel structure 39. The width-to-depth ratio of the maximum cross-section is approximately unity, similarly as in FIG. 6 while on account of the complementary helix angle the number of threads and hence of channels is increased 2.5 times.

It will be realised that from manufacturing considerations whether by casting or machining in some form, it will be preferable if not mandatory to have the number of starts divisible by 4, that is the section normal to the centre-line should be symmetrical about two rectangular axes.

Referring to the rotor of FIG. 1 and the stator barrels of FIGS. 5 to 8, it is clear that the provisions of this invention are necessary to achieve a density of thread crossings per unit area of shear plane surface in excess of the combination of the 8-start barrel with the various rotors where the helix angles are approximately the same in rotor and barrel.

It must be stressed that bringing about such greater density of thread crossings and thereby subdivision of streams, marks very distinctive steps in the grade of difficulty of tasks that can be performed. For example without the use of the provisions of this invention it is quite impossible to achieve final mixing plus extrusion of rubber compounds in the form of usable tyre treads in one pass, starting from pellets of carbon-black masterbatch preblended or premetered with vulcanizing chemicals in powder form. The same can be stated with reference to the mixing-compounding of powdered rubber with carbon-black, extenders and vulcanizing chemicals in one pass. These statements refer to achieving a good quality result on a given size of device at a throughput characteristic of this size, in contradistinction to results at uncharacteristically small outputs which may be achieved on small diameter machines of various conventional mixer-extruders mainly with cylndrical barrels, and which are practically impossible to reproduce in larger sizes of such devices.

Figure 11A:
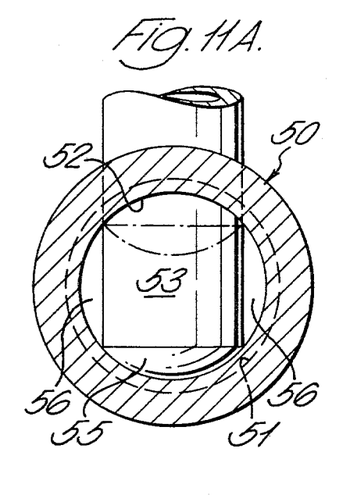
FIGS. 11A and 11B show a simplest version of a continuously adjustable throttle-flange involving one radially moveable restrictor.
Figure 11B:
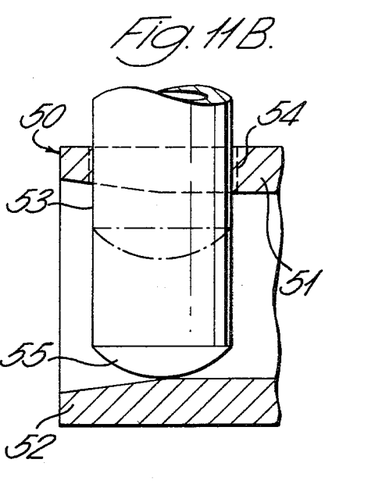

In FIG. 11, the flange 50 shown in sectional elevation (A) and in sectional side view (B) is to be installed at the end of the barrel, that is, between the outlet-flange of the barrel which may end flush with the end of the rotor, and the extrusion-head, cutter or other outlet device.

The entry section 51 of the valve has a parallel cylindrical bore of a smaller diameter than the outlet bore of the barrel so that a fixed restriction amounting to around 60 percent of the outlet cross-section of the barrel is imposed thereby. The end-section 52 of the throttle-flange has a conical bore which makes the end diameter of the throttle-flange the same as that of the barrel, for continuity with an extrusion-head which would have fitted the barrel directly.

The restrictor 53 may in its simplest form be a screw with a relatively fine thread 54 to provide sealing against rubber under pressure and which, if made of steel, would be mounted in, say, a brass sleeve (not shown) to avoid binding. Both the restrictor 53, and the flange 50 can be drilled for circulation of a heating-/cooling medium as known in the art.

The restrictor 53 has a spherical end 55 of the same radius as the bore of entry section 51 of the throttle-valve to permit a close fit when the restrictor is fully inserted. In that case the flow of the medium is reduced to the two symmetrically placed segments 56 of the flow cross-section. For the case of a cold feed rubber extruder, the combined area of these segments may be less than 5 percent of the cross-sectional area of the exit-bore of the barrel and will, by experience, still produce a satisfactory tread extrusion of 5 times the width of the bore of the barrel.

Figure 12A:
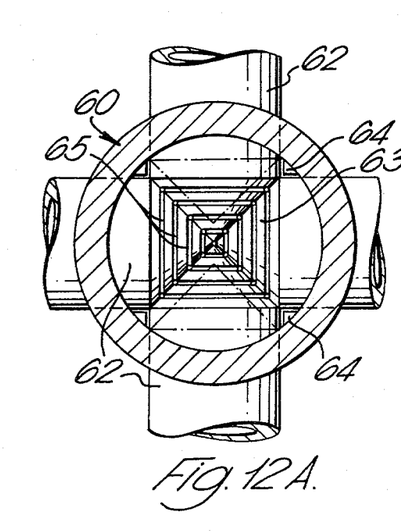
FIGS. 12A and 12B show a version of a continuously adjustable throttle-flange involving 4 radially moveable restrictors.
Figure 12B:
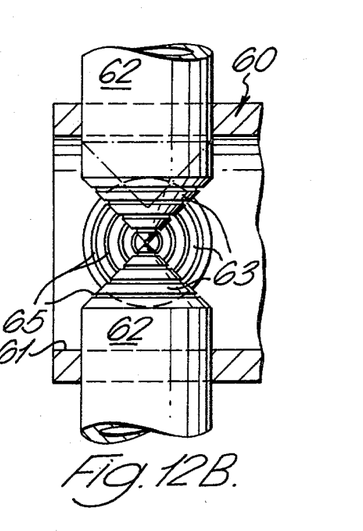

In FIG. 12A and B, the throttle flange 60 has a straight-through bore 61 of the same diameter as the exit-bore of the barrel.

Four restrictors 62 are symmetrically arranged on radial axes and each have a conical tip 63. The full lines show the restrictors in the fully inserted position and the dotted lines in the fully retracted position. In the latter, the maximum opening then is of cruciform shape, limited at the outer edges by wedges 64 fixed in the small segments defined by the cylindrical parts of the restrictors when fully inserted. While these wedges are not absolutely essential, they are shown as a preferred embodiment, because most control is exerted when the restrictors are fairly far in when the four open segments may leave too much cross-sectional area for flow.

For permitting a predetermined amount of flow distributed all over the bore, there may be semi-circular or other shaped grooves 65 in the conical ends of the restrictors so that when closed these form a breaker-plate, in effect.

Compared to the single-restrictor version of FIG. 11, this four-restrictor version of FIG. 12 requires much less radial travel of the restrictors between the open and shut position. As in adjusting preferably during operation the restrictor has to penetrate into a stream of rubber under pressure, the forces involved may be large. Therefore a screw with a fairly fine pitch chosen to provide a good mechanical advantage will require a considerable number of turns and thus longer time to produce an equivalent effect in the single restrictor version than in the four-restrictor version. In fact, the more restrictors are installed the more quickly the device can be adjusted and the more evenly distributed over the flow-cross-section will be the openings for the restricted flow, making for better flow in the extrusion head.

The action of throttling to obtain a higher specific work input into a medium can proceed the more effectively, the more the flow has been subdivided in the preceding mixing section or sections. If there have been very few subdivisions or effectively none, as in a conventional extruder, the throttling leads to "back-flow" within the thread grooves which operates against uniformity of treatment.

What is claimed is:

1. Continuously operating mixing apparatus comprising a rotor mounted to rotate on its axis within a coaxial barrel, the rotor having an external helical thread and the barrel having an internal helical thread of opposite hand to but coaxial with the helical thread on the rotor, said apparatus having at least one mixing zone wherein said threads vary in cross-sectional area in complementary fashion in respect to one another, and wherein said opposite-handed helical threads in a mixing zone complement one another substantially also in respect to their helix angles to the extent that if one helix angle is between 0° and 45°, the other is between 45° and 90°.

2. Apparatus according to claim 1 wherein the sum of the helix angle of the rotor thread and the helix angle of the barrel thread in the same mixing zone is about 90°.

3. Apparatus according to claim 1 wherein the thread which has a helix angle above 45° is constructed with more than eight starts.

4. Apparatus according to claim 1 wherein continuously adjustable output throttling means are provided.

5. Apparatus according to claim 4 wherein the throttling means comprises at least one bore-restricting member mounted for adjustable radial advancement into an extension of the barrel.

6. Apparatus according to claim 4 comprising a plurality of said members adapted to meet one another within the bore and having peripheral passageways for predetermined limitation of closure.

* * * * *

UNITED STATES PATENT AND TRADEMARK OFFICE
CERTIFICATE OF CORRECTION

PATENT NO. : 4,184,772
DATED : January 22, 1980
INVENTOR(S) : Paul Meyer

It is certified that error appears in the above-identified patent and that said Letters Patent are hereby corrected as shown below:

On The Title Page Insert:
---[73] Assignee: Frenkel C-D Aktiengesellschaft
Vaduz, Liechtenstein---

Signed and Sealed this

Twenty-fourth Day of June 1980

[SEAL]

Attest:

SIDNEY A. DIAMOND

Attesting Officer

Commissioner of Patents and Trademarks